(12) United States Patent
Hillenbrand et al.

(10) Patent No.: US 11,635,008 B2
(45) Date of Patent: Apr. 25, 2023

(54) PARTICLE FILTER ASSEMBLY FOR A MOTOR VEHICLE, MOTOR VEHICLE, AND METHOD FOR REGENERATING A PARTICLE FILTER

(71) Applicant: Bayerische Motoren Werke Aktiengesellschaft, Munich (DE)

(72) Inventors: Jan Hillenbrand, Munich (DE); Petar Kis, Munich (DE); Claus Reulein, Treuchtlingen (DE); Martin Wetzel, Emmering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/429,191

(22) PCT Filed: Jan. 15, 2020

(86) PCT No.: PCT/EP2020/050855
§ 371 (c)(1),
(2) Date: Aug. 6, 2021

(87) PCT Pub. No.: WO2020/160882
PCT Pub. Date: Aug. 13, 2020

(65) Prior Publication Data
US 2022/0195901 A1 Jun. 23, 2022

(30) Foreign Application Priority Data
Feb. 7, 2019 (DE) .................... 10 2019 103 001.3

(51) Int. Cl.
*F01N 3/00* (2006.01)
*F01N 3/023* (2006.01)
(Continued)

(52) U.S. Cl.
CPC ......... *F01N 3/023* (2013.01); *B01D 46/2418* (2013.01); *B01D 46/84* (2022.01);
(Continued)

(58) Field of Classification Search
CPC .......... F01N 3/023; F01N 3/0222; F01N 3/30; F01N 13/009; B01D 46/2418; B01D 46/84; B01D 53/94; B01D 2279/30
See application file for complete search history.

(56) References Cited

U.S. PATENT DOCUMENTS

2011/0219752 A1* 9/2011 Gonze ..................... F01N 3/101
60/299
2013/0327023 A1* 12/2013 Schluter .................. F01N 3/035
60/299
(Continued)

FOREIGN PATENT DOCUMENTS

DE 102 57 153 A1 6/2004
DE 10257153 A1 * 6/2004 ............... F01N 3/22
(Continued)

OTHER PUBLICATIONS

PCT/EP2020/050855, International Search Report dated Mar. 13, 2020 (Two (2) pages).
(Continued)

*Primary Examiner* — Matthew T Largi
(74) *Attorney, Agent, or Firm* — Crowell & Moring LLP

(57) ABSTRACT

A particle filter assembly for a motor vehicle includes a particle filter, an exhaust-gas-conducting line which opens into the particle filter, and a secondary air supply. The secondary air supply is formed separately from the exhaust-gas-conducting line and fresh air is suppliable to the particle filter via the secondary air supply.

9 Claims, 2 Drawing Sheets

(51) Int. Cl.
*F01N 13/00* (2010.01)
*B01D 46/84* (2022.01)
*B01D 46/24* (2006.01)
*B01D 53/94* (2006.01)
*F01N 3/022* (2006.01)
*F01N 3/30* (2006.01)

(52) U.S. Cl.
CPC ........... *B01D 53/94* (2013.01); *F01N 3/0222* (2013.01); *F01N 3/30* (2013.01); *F01N 13/009* (2014.06); *B01D 2279/30* (2013.01)

(56) References Cited

U.S. PATENT DOCUMENTS

2019/0195115 A1* 6/2019 Paukner .............. F01N 13/0093
2020/0224573 A1* 7/2020 Williges .................... F01N 3/32

FOREIGN PATENT DOCUMENTS

| DE | 10 2015 212 514 A1 | 1/2017 | |
|---|---|---|---|
| DE | 10 2016 111 086 A1 | 5/2017 | |
| DE | 102016111086 A1 * | 5/2017 | |
| DE | 10 2016 102 325 A1 | 8/2017 | |
| DE | 10 2016 204 691 A1 | 9/2017 | |
| DE | 10 2016 211 274 A1 | 12/2017 | |
| DE | 10 2016 218 818 A1 | 3/2018 | |
| DE | 102016225758 A1 * | 6/2018 | ............. F01N 11/00 |
| DE | 10 2017 102 874 A1 | 8/2018 | |
| DE | 10 2017 218 658 A1 | 8/2018 | |
| DE | 10 2017 205 325 A1 | 10/2018 | |
| EP | 0 715 061 A1 | 6/1996 | |
| GB | 2 555 851 A | 5/2018 | |
| WO | WO 2017/220460 A1 | 12/2017 | |
| WO | WO 2019/081109 A1 | 5/2019 | |

OTHER PUBLICATIONS

German Search Report issued in German application No. 10 2019 103 001.3 dated Feb. 19, 2020, with Statement of Relevancy (Eight (8) pages).

Chinese Office Action issued in Chinese application No. 202080006741.4 dated Jun. 16, 2022, with English translation (Twenty-Three (23) pages).

* cited by examiner

PARTICLE FILTER ASSEMBLY FOR A MOTOR VEHICLE, MOTOR VEHICLE, AND METHOD FOR REGENERATING A PARTICLE FILTER

BACKGROUND AND SUMMARY OF THE INVENTION

The invention relates to a particle filter assembly for a motor vehicle, to a motor vehicle, and to a method for regenerating a particle filter.

In motor vehicles, particle filters are conventionally used for filtering fine dust out of the exhaust gas. Such particle filters have, for example, a honeycomb body on which dust and/or soot particles are deposited. In operating states with excess oxygen in the exhaust gas system (for example overrunning mode, gear shifting operations, etc.) or in gear shifting operations, the particle filter is burned clear in order to remove the embedded particles.

The regeneration of the particle filter requires the availability of oxygen with simultaneously high activation energy. When the particle filter is positioned away from the engine and at low motor loads, suitable operating states for regenerating the particle filter in the conventional customer operating mode can be achieved only with difficulty or only with considerable disadvantages in terms of consumption. If the customer profile is unsuitable for providing a sufficiently high activation energy, it is possible, for example, for the ignition angle to be adjusted in the retard direction in order to increase the exhaust gas temperature. However, this regeneration strategy has a negative effect on the fuel consumption and is dependent on the customer profile in the form of downstream overrunning phases or gear shifting operations in order to push through oxygen in the short load-free or low-load period and to provide the oxygen for burning off soot in the particle filter. The required activation energy may not be achieved here despite the adjustment of the ignition angle to retard, or the necessary oxygen is not sufficiently pushed through, as a result of which the fuel consumption increases without this also being effectively used for regenerating the particle filter. For emission reasons, it is not possible to provide a high exhaust gas temperature and oxygen for regeneration purposes at the same time since this would require a deviation from the stoichiometric emission strategy.

It is therefore an object of the present invention to provide a device and a method for improved regeneration of particle filters.

This object is achieved according to the invention by a particle filter assembly for a motor vehicle, comprising at least one particle filter, at least one exhaust-gas-conducting line, which opens into the particle filter, and at least one secondary air supply, which is formed separately from the exhaust-gas-conducting line, wherein fresh air can be supplied to the particle filter via the secondary air supply.

A particle filter should be understood as meaning a housing with a honeycomb body located therein, for example a honeycomb body made from ceramic. During the operation of the motor vehicle, exhaust gas flows through the honeycomb body, with fine dust particles being deposited in the honeycomb body in order to clean the exhaust gas.

Irrespective of the engine mode, i.e., at any operating points of the engine, air can be supplied by means of the separately formed secondary air supply to the particle filter for regeneration purposes. This means that the fresh air required for the regeneration does not have to be supplied via the exhaust gas. The driving mode and the fuel consumption are therefore not negatively influenced by the regeneration although the particle filter can be regenerated in every operating state of the motor vehicle as long as the temperature in the particle filter is sufficiently high.

Secondary air or fresh air is supplied, for example, into the exhaust-gas-conducting line or directly into the housing of the particle filter.

For the conversion of gaseous emissions, a catalytic converter assembly, in particular a catalytic converter in the vicinity of the engine, is connected upstream of the particle filter assembly, with fresh air being supplied to the particle filter downstream of the catalytic converter assembly. In other words, the fresh air is conducted past the catalytically effective volume. The operation of the catalytic converter is thus not negatively affected by the supply of air and thus oxygen, and the stoichiometric emission strategy is not infringed.

The particle filter is consequently likewise arranged downstream of the catalytic converter.

The secondary air supply preferably comprises a line, wherein a valve, in particular a switchable valve, is arranged in the line. The valve is preferably a regulating valve. The supplied quantity of fresh air can thereby be controlled or regulated depending on requirements. As a result, at any operating point of the engine, the regeneration of the particle filter can be initiated by supply of secondary air if the particle filter has a temperature sufficient for this purpose. In this respect, the particle filter can also be regenerated outside the overrunning mode at operating points with a high exhaust gas temperature, which was previously not possible.

A switchable valve has the advantage that, in operating states in which no regeneration of the particle filter is desired, secondary air is also not conducted past the engine. The compressor therefore does not have to unnecessarily compress fresh air which is not intended for the combustion within the engine, which in turn, by means of the fresh air bypass, minimizes a possible increase in the fuel consumption.

A further advantage is the targeted metering in of fresh air such that an exothermic reaction in the particle filter can be controlled and damage to the filter owing to burning-off proceeding too rapidly is thereby avoided.

In order to be able to regulate the metering-in of the fresh air as precisely as possible, the secondary air supply can comprise a measuring section for determining the secondary air mass flow. Such a measuring section can typically be realized by a defined throttle or nozzle, wherein a conclusion can be drawn regarding the mass flow from the pressure upstream or, in the narrowest cross section, with the pressure downstream and with a stored characteristic curve.

In addition to the primary use as a secondary air supply for the purpose of regenerating the particle filter, the invention can also be used for supporting the load discharge, in particular if air is extracted on the high pressure side of a supercharged Otto engine. By means of the bypass to the exhaust gas side, fresh air which has already been compressed and which previously still had to be supplied for combustion can now be conducted past the engine such that the manifold pressure can decrease more rapidly. The engine power, in particular the charging pressure, can thus be reduced more rapidly while maintaining component protection limits and acoustic requirements. It is thus possible to dispense with what is referred to as a divertor valve which is typically used for supporting the load discharge via the fresh air side. In this connection, the high and low pressure side of the intake air supply is bypassed, and therefore, when the divertor valve is open, the compressor pumps previously compressed fresh air in the circuit. Divertor valves are frequently integrated as an internal divertor valve in the compressor housing for cost and space reasons, which typically results in losses in the compressor efficiency. The invention accordingly also makes it possible to maintain compressor efficiency, with equivalent functionality with regard to the load discharge.

In order to provide a sufficient air pressure in the secondary air supply, in particular in the line, the secondary air supply comprises a pump, in particular an air pump or a suction jet pump. A sufficient quantity of air can thereby be supplied within a very short time.

The secondary air supply can be supplied externally or can be connected in terms of flow to an intake tract of an internal combustion engine. This solution is particularly appropriate in the case of supercharged engines. In this embodiment, an additional pump can be dispensed with, as a result of which the regeneration system can be formed particularly cost-effectively and saving on construction space. Furthermore, the fresh air is thereby already preheated, which has an advantageous effect on the regeneration of the particle filter. The exhaust gas mass flow entering the particle filter is therefore only slightly cooled by the supply of fresh air, which is advantageous with respect to the regeneration behavior of the particle filter. In other words, a cooling effect of the supplied fresh air in the particle filter is thereby reduced. The particle filter thus maintains its ignition temperature for longer and can be regenerated over a greater period of time. As a result, for example, an additional heater for heating up the fresh air and/or the particle filter so as to cover similarly large time windows can be dispensed with.

The fresh air can be tapped off, for example, downstream of the compressor, in particular upstream of a charge air cooler.

To regulate the secondary air supply when the fresh air is tapped off from the intake tract of a supercharged Otto engine, it is expedient to position the tapping off of the fresh air supply upstream of the throttle valve or another regulating member on the fresh air side such that the compressor or the compressors for supplying the secondary air can run into any operating points without changing the supply of fresh air for combustion within the engine. In other words, the load within the engine and the regeneration of the particle filter assembly can thus be regulated independently of each other.

According to one embodiment, the particle filter is arranged upstream of a muffler. Dust particles are thereby already filtered out before the exhaust gas flows into the muffler. Soiling of the muffler is thus avoided.

Alternatively, it can be provided that the particle filter is arranged downstream of the muffler. The particle filter can also be integrated in the muffler.

The particle filter is, for example, an Otto particle filter. The emission of soot particles can thus be reduced by means of the particle filter even in the case of motor vehicles having Otto engines.

The object is furthermore achieved according to the invention by a motor vehicle having an internal combustion engine, in particular an Otto engine, and having a particle filter assembly which is designed as described previously, wherein the particle filter assembly is connected to an exhaust gas system of the motor vehicle. The separate secondary air supply provides the possibility of setting the operating parameters of an engine in such a manner that, specifically, a high exhaust gas temperature is generated and at the same time air is brought into the particle filter without departing from the stoichiometric air/fuel ratio.

Furthermore, the object is achieved according to the invention by a method for regenerating a particle filter of a particle filter assembly in the driving mode of a motor vehicle, wherein the particle filter assembly is designed as described previously, comprising the following steps:
  cleaning an exhaust gas flowing through the particle filter by depositing soot particles on a surface of a honeycomb body,
  supplying fresh air in addition to the exhaust gas into the particle filter, and
  burning off the deposited soot particles.

This method can reliably clean the exhaust gas of soot particles. The fine dust emission of a motor vehicle is thereby reduced. Furthermore, the particle filter can be regenerated or cleaned in the driving mode of the motor vehicle by the deposited soot particles being burnt off. In other words, the particle filter is burned clear.

In particular, the particle filter is regenerated at any operating points of the motor vehicle. Since the secondary air, i.e., the fresh air, is additionally available or blown in, the regeneration of the particle filter can be carried out at any operating points of the engine if the exhaust gas temperature necessary for this purpose is present. By contrast thereto, in the prior art, it was possible to regenerate the particle filter only at operating points with excess oxygen in the exhaust gas, for example in the overrunning mode or during gear shifting operations. In other words, special operating phases with a hot exhaust gas temperature can now be used for regenerating the particle filter. The regeneration is thereby not limited to the excess oxygen in the exhaust gas, as is the case in the prior art, since the fresh air can now be supplied independently of the exhaust gas and independently of the engine operation.

During the regeneration of the particle filter, a secondary air mass flow can be measured, in particular over a measuring section. As already explained above, the metering in of the fresh air can thereby be regulated as precisely as possible.

According to one embodiment of the method, compressed fresh air is conducted past the engine by means of the secondary air supply and is therefore no longer available for combustion within the engine. In particular, the fresh air is tapped off on a high pressure side of an internal combustion engine in order to rapidly reduce a charging pressure.

Further advantages and features of the invention emerge from the description below and from the drawings below, to which reference is made.

DETAILED DESCRIPTION OF THE DRAWINGS

Figure 1:
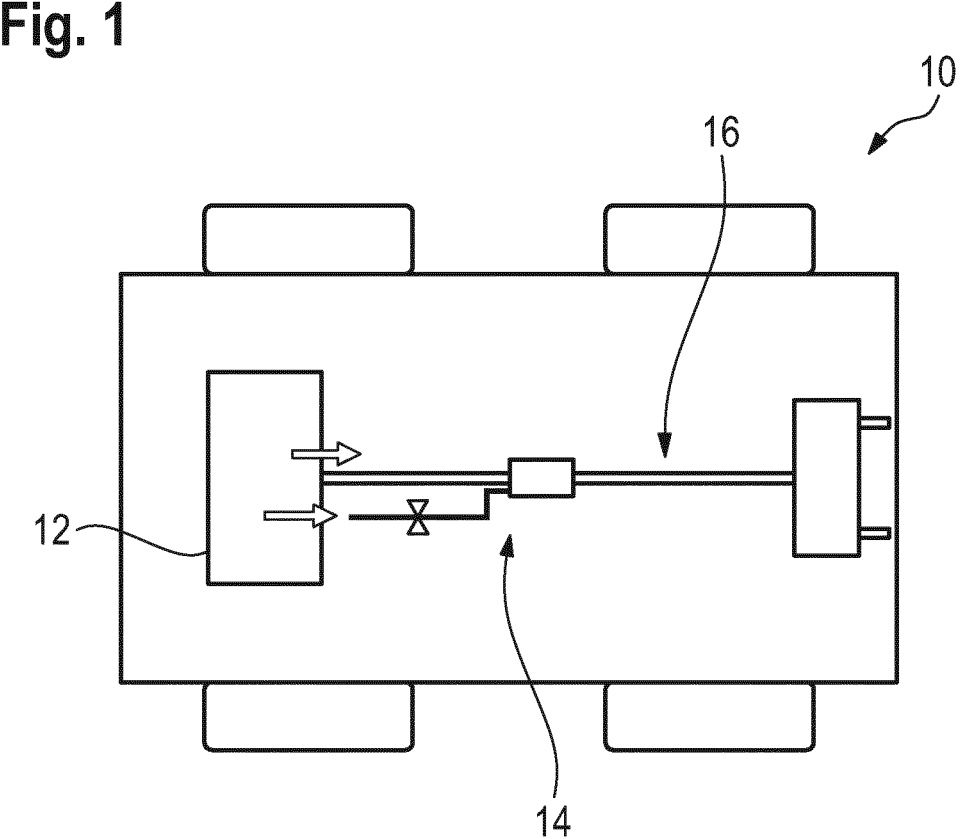
FIG. 1 schematically shows a motor vehicle according to the invention with a particle filter assembly.

FIG. 1 shows a motor vehicle 10 according to the invention having an internal combustion engine 12, in particular having an Otto engine, and having a particle filter assembly 14. The particle filter assembly 14 is connected in terms of flow to an exhaust gas system 16 of the motor vehicle 10.

Figure 2:
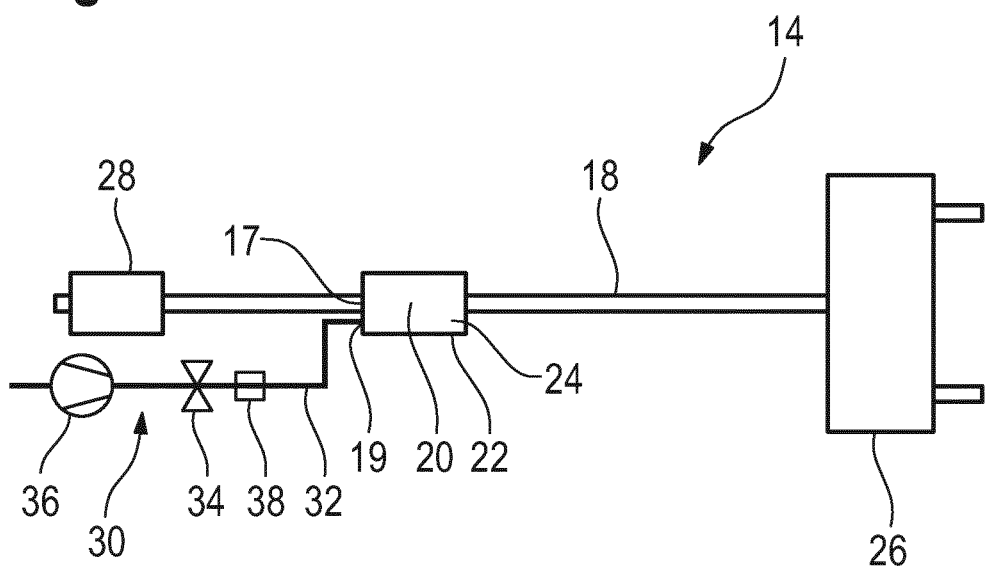
FIG. 2 schematically shows a particle filter assembly according to the invention.

FIG. 2 shows a particle filter assembly 14 according to the invention for a motor vehicle, for example for a motor vehicle 10 as illustrated in FIG. 1.

The particle filter assembly 14 comprises an exhaust-gas-conducting line 18 which is connected to the exhaust gas system 16 of the motor vehicle 10 or which is simultaneously part of the particle filter assembly 14 and of the exhaust gas system 16. The particle filter assembly 14 illustrated in FIG. 2 is a single-flow arrangement, that is to say a particle filter assembly 14 having just one exhaust-gas-conducting line 18.

The particle filter assembly 14 furthermore comprises a particle filter 20 which has a housing 22 and a honeycomb body 24 arranged in the housing 22.

In the embodiment shown, the particle filter 20 is arranged upstream of a muffler 26 and downstream of a catalytic converter 28. Alternatively, the particle filter 20 can be located downstream of a muffler 26 or in a muffler 26.

The particle filter 20 can also be arranged downstream of the muffler 26. The particle filter 20 can also be integrated in the muffler 26.

For the regeneration of the particle filter 20, the particle filter 20 comprises a secondary air supply 30 via which fresh air can be supplied to the particle filter 20, specifically by means of a line 32. The secondary air supply 30 is formed separately from the exhaust-gas-conducting line 18 here.

The particle filter 20 thus comprises an exhaust gas inlet 17 and an air inlet 19 which is formed separately from the exhaust gas inlet 17.

In order to control or to regulate the fresh air supply, a valve 34, for example a switchable valve, in particular a regulating valve, is arranged in the line 32. As a result, irrespective of the short operating points with excess oxygen in the exhaust gas system of the internal combustion engine 12 (for example overrunning mode, gear shifting operations, etc.), fresh air can be supplied to the particle filter 20 at any operating points.

The secondary air supply 30 also comprises a pump 36 in order to sufficiently build up pressure in the line 32 so as to supply fresh air to the particle filter 20, for example a suction jet pump or a secondary air pump.

Alternatively or additionally, the secondary air supply 30, in particular the line 32, can be connected in terms of flow to an intake tract of the internal combustion engine 12.

Figure 3:
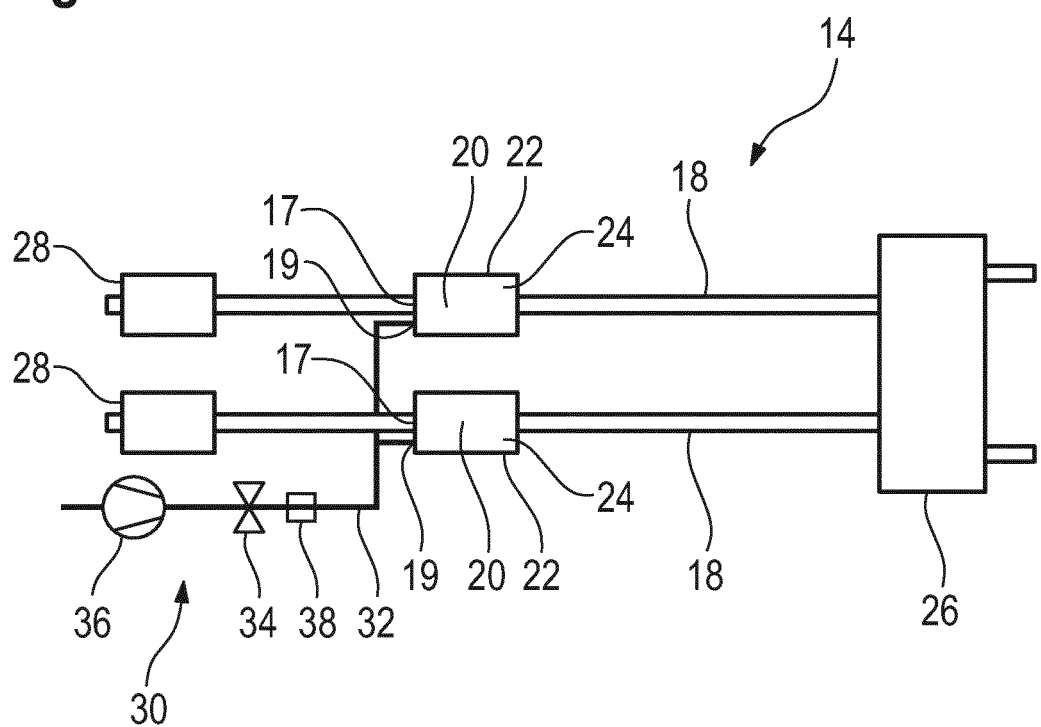
FIG. 3 schematically shows a further particle filter assembly according to the invention.

FIG. 3 shows a further embodiment of a particle filter assembly 14 according to the invention. The particle filter assembly 14 according to FIG. 3 differs from the exemplary embodiment illustrated in FIG. 2 in that it is a two-flow arrangement, that is to say a particle filter assembly 14 having two exhaust-gas-conducting lines 18. A particle filter assembly 14 is arranged in each of the exhaust-gas-conducting lines 18. Two-flow exhaust gas systems are generally used in the case of high-performance internal combustion engines.

In this case, the secondary air supply 30 comprises a branching line 32 which supplies fresh air equally to the two particle filters 20. Alternatively, two separate lines 32 can also be provided.

The particle filter 20 is regenerated equally for each embodiment.

In the driving mode of the motor vehicle 10, first of all exhaust gas is cleaned by exhaust gas flowing through the particle filter 20 and, in the process, soot particles being deposited on a surface of the honeycomb body of the particle filter 20.

For the regeneration of the particle filter 20, fresh air in addition to the exhaust gas is additionally supplied into the particle filter 20. The deposited soot particles can thereby be burned off.

In particular, the fresh air is supplied separately from the exhaust gas air, which means that the fresh air is mixed with the exhaust gas only in the particle filter 20. It is also possible for the line 32 for supplying fresh air to open into the exhaust-gas-conducting line 18 upstream of the particle filter 20, but in any case downstream of the catalytic converter 28.

In order to measure a mass flow of the secondary air, a measuring section 38 is provided both in the case of the single-flow and in the case of the two-flow embodiment.

What is claimed is:

1. A particle filter assembly for a motor vehicle, comprising:
   a particle filter;
   an exhaust-gas-conducting line which opens into the particle filter; and
   a secondary air supply, wherein the secondary air supply is formed separately from the exhaust-gas-conducting line and wherein fresh air is suppliable to the particle filter via the secondary air supply, wherein the secondary air supply is not connected in terms of flow to an intake tract of an internal combustion engine, wherein a pump is disposed in the secondary air supply, wherein the pump is a suction jet pump, wherein a throttle valve is disposed in the secondary air supply downstream of the pump in a direction of flow of the fresh air, wherein a measuring section is disposed in the secondary air supply downstream of the throttle valve in the direction of flow of the fresh air, and wherein the particle filter has an exhaust gas inlet and an air inlet and wherein the air inlet is formed separately from the exhaust gas inlet.

2. The particle filter assembly according to claim 1, wherein the particle filter is disposed downstream of a catalytic converter and wherein the fresh air supply is disposed downstream of the catalytic converter.

3. The particle filter assembly according to claim 1, wherein the particle filter is an Otto particle filter.

4. A motor vehicle, comprising:
   an internal combustion engine;
   an exhaust gas system; and
   the particle filter assembly according to claim 1, wherein the particle filter assembly is connected to the exhaust gas system.

5. The motor vehicle according to claim 4, wherein the internal combustion engine is an Otto engine.

6. A method for regenerating the particle filter of the particle filter assembly according to claim 1 in a driving mode of a motor vehicle, comprising the steps of:
   cleaning an exhaust gas flowing through the particle filter by depositing soot particles on a surface of a honeycomb body of the particle filter;
   supplying fresh air in addition to the exhaust gas into the particle filter by the secondary air supply; and
   burning off the deposited soot particles.

7. The method according to claim 6, wherein the particle filter is regenerated at any operating points of the motor vehicle.

8. The method according to claim 6 further comprising a step of measuring a secondary air mass flow.

9. The particle filter assembly according to claim 1, wherein the measuring section is a throttle or a nozzle.

* * * * *